INVENTOR.
Salvatore D'Acunto
BY
Cushman, Darby & Cushman
Attorneys

INVENTOR.
Salvatore D'Acunto
BY
Cushman, Darby & Cushman
Attorneys 3,454,725
AUTOMATIC DIALLING DEVICE
Salvatore D'Acunto, Via Appia 388, Scauri, Italy
Filed Mar. 7, 1966, Ser. No. 532,313
Claims priority, application Italy, Mar. 8, 1965, 5,404/65
Int. Cl. H04m *1/26*
U.S. Cl. 179—90 9 Claims

ABSTRACT OF THE DISCLOSURE

An automatic dialling device which is adapted to automatically dial a pre-established telephone number on a dial telephone set and wherein the simple depression of a push-button or lever or any other contact will cause the desired number to be dialed.

The object of my present invention is a device which automatically dials a pre-established telephone number on a dial telephone set. Such a device, which can be remote controlled, is particularly useful to effect emergency calls, where there is no time nor possibility to reach a telephone and dial the complete number of a police station, a hospital, etc., because in the present device the simple depression of a push button or lever or any other contact placed within reach will cause the desired number to be dialed.

Basically, the device of the present invention comprises: a circular plate, fastened to the finger disc of the telephone set and presenting a spiral groove as well as slots in said spiral groove, positioned correspondingly to the digits of the number to be dialed; a wheel, slidable on a rod and guided within said groove, the rod being rotated by an electric motor; and means to disengage the wheel from the slots into which it has penetrated. These means are completed by an electric motor to rotate the disc, by switch means stopping or inverting the rotation of the wheel, means to cause the telephone set to be connected or isolated from the line, etc.

The construction and operation of my dialling device will become clear from the following description of two embodiments thereof, taken with reference to the attached drawing, in which.

Figures 1, 2:
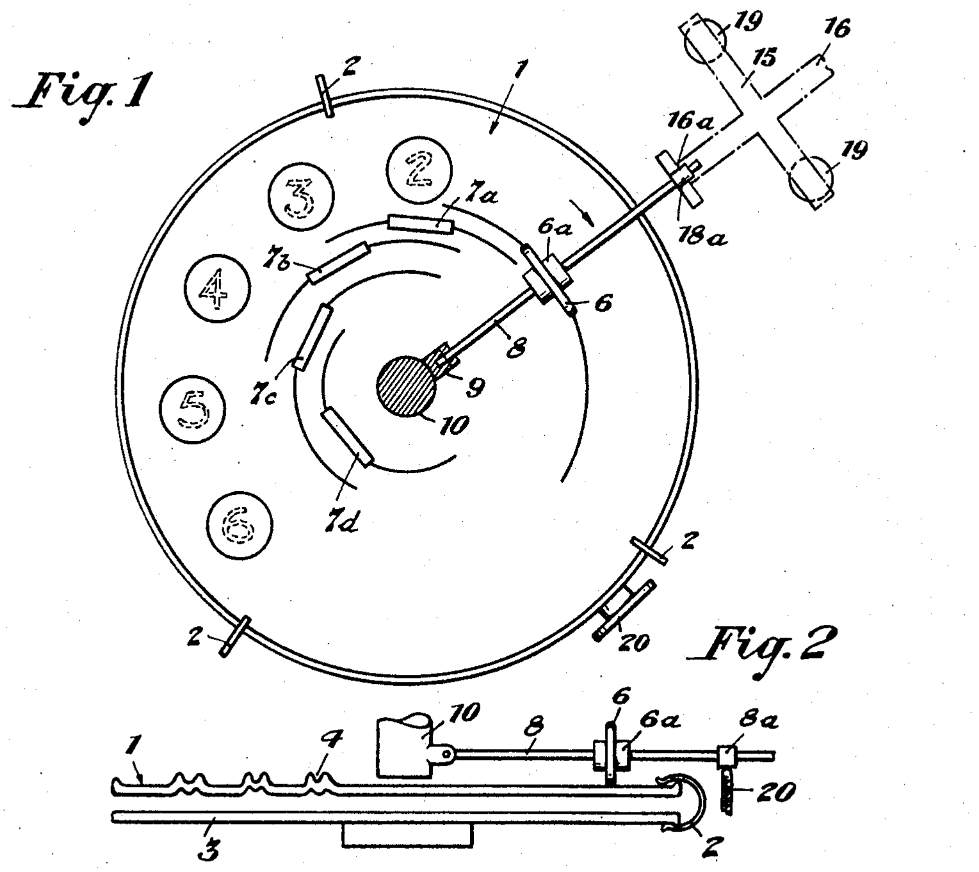
FIGURE 1 is a partial top view of a first embodiment of my invention.
FIGURE 2 is a partial lateral view corresponding to FIGURE 1.
Figure 3:
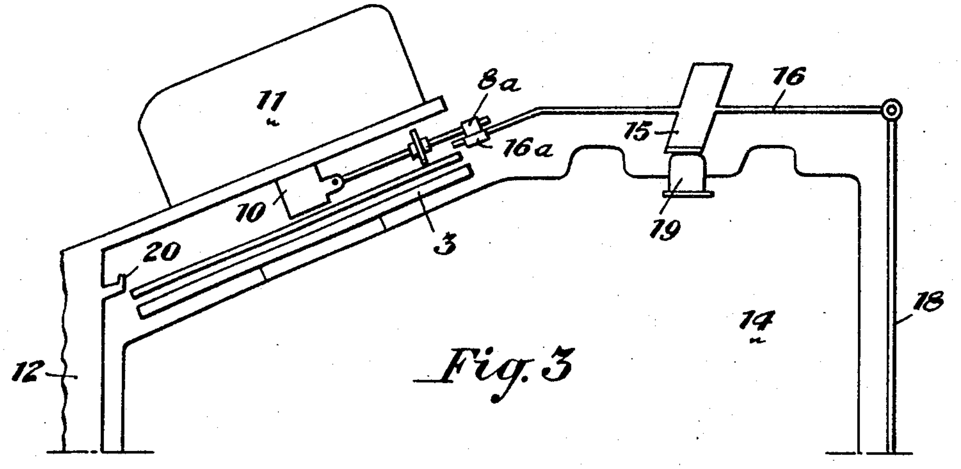
FIGURE 3 is a lateral view of my device, as applied to a conventional telephone set.

With reference to FIGURES 1–3, the grooved circular plate, generally indicated at 1, is secured, as by clamps 2, to the finger disc 3 of the telephone set. Plate 1 contains a spiral groove 4 extending from the vicinity of the plate center to the vicinity of the raised outer rim 5 of plate 1. Each spire contains a single slot such as 7*a*, 7*b*, 7*c*, etc., therefore the number of spires must at least equal the number of digits comprising the telephone number to be dialed by my device.

The raised rim 5 also serves to prevent wheel 6 from rolling out of plate 1, once it has reached the outer end of the spiral groove 4. Slots 7*a*, 7*b*, etc. are located at the bottom of the groove at points radially corresponding to the digits composing the number. Each slot corresponds to one of the digits of said number.

Thereby, the first slot encountered by wheel 6 during its travel along the groove 4, from the inner spire to the outermost spire of the spiral, will therefore represent the first digit of the telephone number, the second slot the second digit and so forth.

Wheel 6 is rotatably and slidably mounted, by its hub 6*a*, on a rod 8, one end of which is so linked to a lug 9 fixed to a drive shaft 10, that it can swing in a plane perpendicular to the plane of plate 1. A spring, not shown, applied to the link depresses the wheel against the bottom of groove 4.

In the present embodiment, the drive shaft 10 coincides with the shaft of a small electric motor 11, which rotates in a clockwise direction and is maintained perpendicular to the groove plate 1 by any conventional means, such as by securing the motor to the inclined shelf 12. Conveniently, this shelf is fastened to a base plate 13, which also carries the telephone set 14.

In lieu of the handset, which is removed from the cradle of the set upon which the present device is installed, a crosspiece 15, fixed to an arm 16 hinged at 17 to a stationary member 18 is used to coact with the contact plungers 19 which connect the handset to the telephone line or disconnect it from it. The free end of the arm 16 terminates in a cam 16*a*, which extends into the path of rod 8. When wheel 6 lies in its rest or starting position, the end 8*a* of rod 8 is placed upon said cam and the downward bias exerted upon rod 8 by the spring placed on its link causes the crosspiece 15 to depress the contact plungers 19, thereby disconnecting the receiver from the line.

The connection between handset and line is restored as soon as the motor circuit is closed and thereby the motor 11 causes rod 8 to rotate and thereby disengage cam 16*a* and consequently also the plungers 19, which will rise to their contact-making position under the force of their springs.

Correspondingly to the conventional finger stop provided on telephone set dials, a stationary cam 20, fastened for instance to the shelf or bracket 12, projects into the path of the end 8*a* of rod or wheel axle 8, to lift it, together with wheel 6, every time said rod end moves over its surface. Finally a stationary conventional microsswitch is positioned suitably to open the motor circuit as soon as the wheel has reached the outermost end of the spiral groove.

The operation of the device is as follows:

The rotation of drive shaft 10 and therefore of rod 8, once the motor circuit has been closed, will disengage cam 16*a* from rod end 8*a*, thereby permitting the contact plungers 16 to rise and connect, in the usual manner, the telephone handset with the line. Wheel 6 will begin its travel within the groove, into which it is depressed by the spring acting upon its joint with lug 9. As soon as wheel 6 meets the first slot, it will penetrate it under the action of said spring, will remain entrapped in it and thus rod 8 will entertain plate 1 and thus finger disc 3 in an arc, until the end 8*a* meets cam 20. Thus, the first digit is dialed. Rod end 8*a* will continue its rotation, moving over cam surface 20 to re-enter the groove and continue its travel therein. The arc described by members 1 and 3 has meanwhile resulted in the dialling of the first digit. The disengagement of wheel 6 from the first slot, caused by cam 20, permits members 1 and 3 to return to their starting position.

Wheel 6, rotating in the second spire, will at a certain moment penetrate the second slot, and thus the second digit will be dialled, in the manner just described. The dialling operation will continue until no more slots are encountered by wheel 6 and, in the outermost spire of the groove 4, wheel 6 strikes a not shown microswitch, to close the motor circuit and thereby stop the whole operation.

Figures 4, 5:
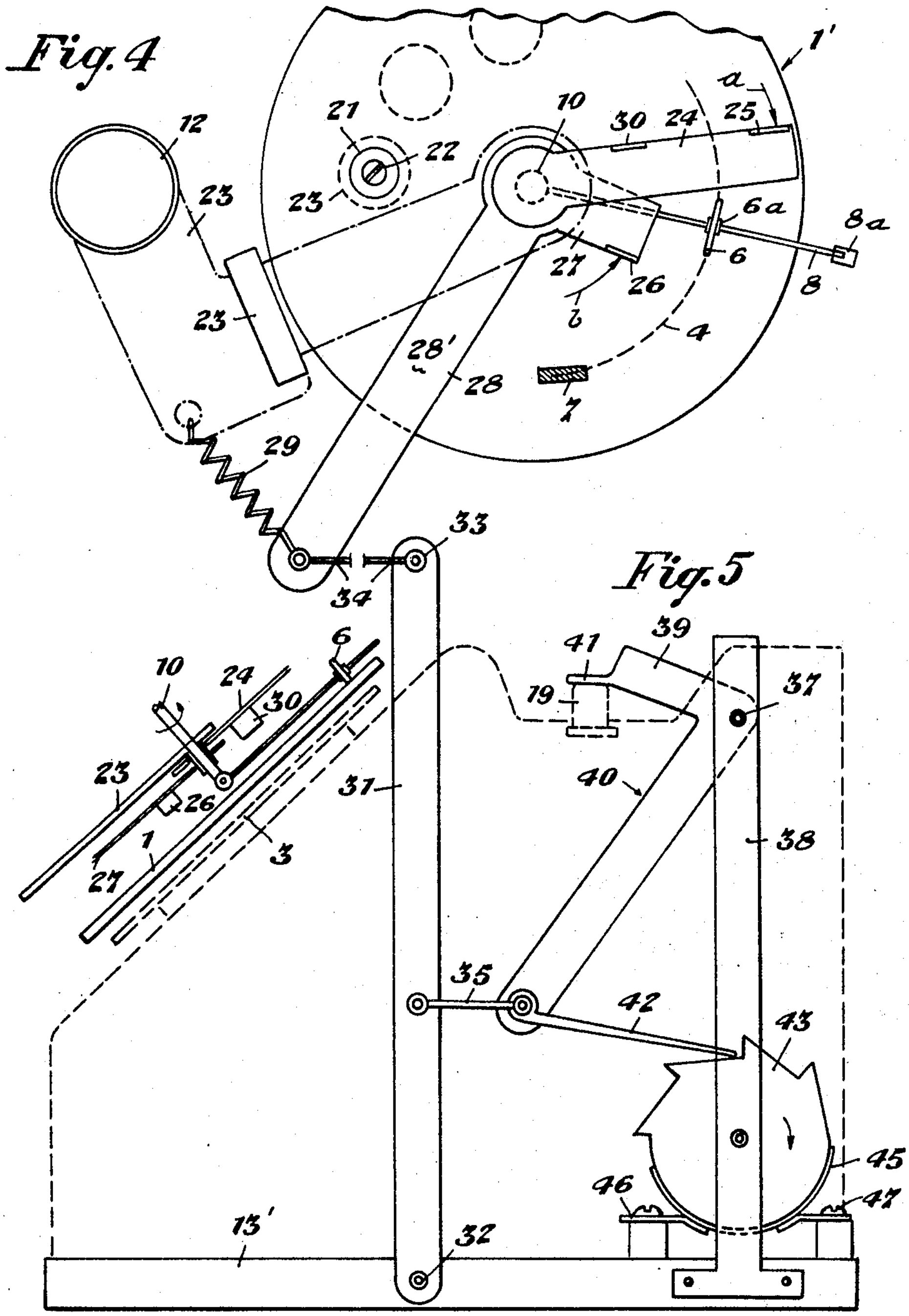
FIGURES 4, 5 are a view of another embodiment of my invention, with the dialling device proper shown rotated into a horizontal position, to show it in top view.

The embodiment shown in FIGURE 4 has the following elements in common with the embodiment represented in FIGURES 1–3: plate 1, with the spiral groove 4, slots 7, wheel 6, the mounting of wheel 6 on rod 8, and the connection of rod 8 to shaft 10. The circular grooved plate 1' is connected to the finger disc 3 by a cylindrical lug 21 fastened to plate 1' as by a screw 22 and penetrating into the hole 23 of the finger disc corresponding to the digit 0 in the dial.

As in the previously described embodiment, the wheel 6 is lifted from the slots by the coaction of rod end 8*a* with a cam 23.

In its purpose, the embodiment of FIGURE 4 differs from the previous one by the feature of being able to repeat a pre-established call. To render this possible, this embodiment comprises a thin flat strip 24, mounted coaxially with, but independently of plate 1'. At its free end, correspondingly to the outermost spire of groove 4, strip 24 carries a vertical tongue 25, which wheel 6 will strike at the end of its dialling operation and entrain in the direction of arrow *a* until it abuts against a stationarily mounted electric switch, of any known type and therefore not represented, which inverts the rotation of the motor and consequently of rod 8 and its wheel 6, which will thus return, in the direction indicated by arrow *b*, to its starting position at the end of the innermost spire of groove 4. There it will strike the vertical tongue 26 placed on arm 27*a* of a bell crank lever 27, which is also mounted coaxially with but independently of the motor shaft 10, and whose other arm 27*b* is yieldingly connected, as by a spring 29, to the stationary support 12. Under the action of wheel 6 tongue 26 will be rotated counterclockwise until it engages another vertical tongue 30, projecting from strip 24, and thereby strip 24 and its tongue 25 will be also rotated counterclockwise, whereby the stationary switch coacting with tongue 25 will be restored to its initial position and consequently motor 11 will restart its clockwise rotation and therefore wheel 6 will restart its dialling cycle.

The mechanism controlling the connection and isolation of the handset from the telephone line and limiting the succession or repetition of the dialling operation consists of a lever 31, whose one end is fulcrumed at 32 to the base plate 13' and whose other end is coupled to the free end of lever arm 28 by a link 34. Lever 31 is associated, by another link 35, to the free end of an arm 36 of a vertical crank lever 40, which is pivoted at 37 to a frame member 38. The other arm 39 of crank lever 40 terminates in a horizontal shoulder 41 extending over the contact plungers 19 of the telephone set. By this arrangement, each time wheel 6 starts its rotation in the direction of arrow *a* to perform its dialling operation, spring 29 is free to rotate the interconnected crank levers 28' and 36 clockwise, to free plungers 19 and thus connect the handset to the line. When, on the other hand, lever 27 is rotated counterclockwise by wheel 6 returning to its initial position, also lever 36 is rotated in the same direction and its shoulder 41 depresses plungers 19 to isolate the handset from the line.

To obtain a succession of calls, the free end of lever 36 carries a pawl 42 coacting with a ratchet wheel 43 journaled in frame member 38. Wheel 43 is made of non-conductive material. Its upper circumference is provided with teeth 44, while a portion of its lower circumference carries a strip of conducting material interconnecting two electric contacts 46 and 47 inserted in the circuit of motor 11. Each time wheel 6 returns to its starting position, its action on arm 27 will cause pawl 42 to rotate ratchet wheel 43 in a clockwise direction around a fraction of its circumference, and each time wheel 6 inverts its rotation, spring 29 will cause lever arm 36 to swing back, whereby pawl 42 will engage another tooth. In other words, each dialling cycle will produce a partial rotation of wheel 43, and the cycles will be repeated as long as the conductive strip 45 remains in contact with both elements 46 and 47.

The device is conveniently completed with a tape recorder, which speaks into the microphone of the handset the caller's address and its instructions as, for instance, its call for help.

Obviously, many changes and additions can be applied to the above described embodiments, without departing from the scope of my present invention. So, for instance, the spiral groove in the circular plate can be eliminated by conferring screw threads both to the rod 8 and the corresponding hub 6*a* of wheel 6, whereby wheel 6 will describe a spiral during the rotation of rod 8. Similarly, the slot 7 can be replaced by any suitable stops. Also plate 1 or 1' can be provided with concentric spirals, whose slots correspond to different telephone numbers. All such changes lie within the reach of anybody skilled in the art.

What I claim is:

1. A motor driven device for automatically dialling a telephone number on a telephone set, comprising in combination:

plate means fastened to the finger disk of the telephone set;

a circular member revolving on said plate means;

means moving said circular member in a spiral path on said plate means;

stop means positioned along said spiral path, to fixedly engage said circular member;

cam means, positioned correspondingly to the finger stop of the telephone set dial, to disengage said circular member from said stop means.

2. A device as per claim 1, further comprising:

means coacting with said circular member to lift and depress the contact plungers of the telephone set, said means being assembled pivotally to a stationary member and coacting with said circular member to connect and disconnect the telephone handset with the telephone line.

3. A device according to claim 1, wherein the means moving said circular member along a spiral path comprise a rod or axle jointed to a drive shaft, said rod forming the wheel axle on which said circular member is freely slidable and rotatable; a spiral groove formed on said plate means; and spring means on the rod joint, resiliently biasing said circular member against the bottom of said groove.

4. A device according to claim 1, wherein said stop means are slots, each slot being positioned in a separate spire of said groove, at points radially corresponding to the dial digits composing the telephone number to be dialed, into which slots the circular member is engageable.

5. A device according to claim 1, wherein the stationary cam means disengaging said circular member from said slot is a cam positioned correspondingly to the finger stop in the telephone set dial.

6. A device according to claim 2, wherein the means to actuate the contact plungers is a pivotally supported arm carrying a crosspiece correspondingly to said plungers, said arm extending into the circular path of the end portions of the rod forming the axle of said circular member, said crosspiece coacting with the contact plungers to depress them when the end of said rod rests upon the end of said arm and letting them free to rise once the ends of said arm and said rod are brought out of engagement.

7. A device according to claim 1, further comprising:

arm means coaxial with said drive shaft; a first upwardly projecting abutment for the circular member positioned on said arm means correspondingly to the outer end of the spiral path; a second abutment positioned on said arm correspondingly to the inner end of said spiral path; first lever means coaxially rotatable with said drive shaft; abutment means on the first arm of said lever means coacting with said second abutment; stationary electric switch means, engageable with said first abutment, to reverse the rotation of said drive shaft.

8. A device according to claim 7, further comprising: second lever means linked to the second arm of first lever means; crank lever means pivoted on a stationary member, one end of said crank lever being linked to said second lever, the other end of said crank lever coacting with the contact plungers of the telephone set.

9. A device according to claim 8, further comprising: a rotatable cylindrical body of non-conducting material; ratchet tooth means on a portion of the circumference of said cylindrical body; conductive means on another portion of said cylindrical body, interconnecting two contacts of the circuit in the motor controlling said drive shaft; pawl means on the crank lever, coacting with said ratchet teeth to rotate said cylindrical body, said pawl means being actuated by the movement of said first lever means.

References Cited

UNITED STATES PATENTS

| | | | |
|---|---|---|---|
| 3,404,239 | 10/1968 | Awad | 179—90 |
| 3,335,232 | 8/1967 | Lund | 179—90 |

KATHLEEN H. CLAFFY, *Primary Examiner.*

A. H. GESS, *Assistant Examiner.*